United States Patent [19]

Edwards et al.

[11] Patent Number: 5,814,134
[45] Date of Patent: Sep. 29, 1998

[54] APPARATUS AND METHOD FOR DEGASSING DEIONIZED WATER FOR INSPECTION AND PACKAGING

[75] Inventors: Russell J. Edwards; Darren S. Keene; Jonathan P. Adams, all of Jacksonville, Fla.

[73] Assignee: Johnson & Johnson Vision Products, Inc., Jacksonville, Fla.

[21] Appl. No.: 601,716

[22] Filed: Feb. 15, 1996

Related U.S. Application Data

[63] Continuation-in-part of Ser. No. 258,557, Jun. 10, 1994, Pat. No. 5,578,331, and a continuation-in-part of Ser. No. 432,957, May 1, 1995, Pat. No. 5,649,410.

[51] Int. Cl.$^6$ .................................................. B01D 19/00
[52] U.S. Cl. .................... 96/6; 95/46; 95/266; 96/193; 206/5.1; 222/330
[58] Field of Search .................... 95/46, 52, 247, 95/266; 96/6, 7, 8, 193, 194, 219; 222/478, 330; 206/5.1

[56] References Cited

U.S. PATENT DOCUMENTS

| | | | |
|---|---|---|---|
| 2,922,445 | 1/1960 | Osmond et al. | 141/170 |
| 3,389,811 | 6/1968 | Frank | 73/45.3 |
| 3,458,967 | 8/1969 | Ziche | 53/54 |
| 3,751,879 | 8/1973 | Allington | 96/6 |
| 3,934,920 | 1/1976 | Rowekamp | 294/87 R |
| 4,079,845 | 3/1978 | Warren | 214/8.5 D |
| 4,164,099 | 8/1979 | Grant | 51/216 LP |
| 4,223,782 | 9/1980 | Giambalvo | 206/5.1 |
| 4,315,760 | 2/1982 | Bij De Leij | 95/266 |
| 4,401,207 | 8/1983 | Garvey | 198/580 |
| 4,411,574 | 10/1983 | Riley | 414/121 |
| 4,415,076 | 11/1983 | Campbell | 206/5.1 |
| 4,444,424 | 4/1984 | Lebret | 294/87 R |
| 4,495,313 | 1/1985 | Larsen | 523/106 |
| 4,520,596 | 6/1985 | Otto et al. | 51/55 |
| 4,565,348 | 1/1986 | Larsen | 249/122 |
| 4,640,489 | 2/1987 | Larsen | 249/122 |
| 4,680,336 | 7/1987 | Larsen et al. | 524/548 |
| 4,691,820 | 9/1987 | Martinez | 206/205 |
| 4,729,773 | 3/1988 | Shirato et al. | 96/6 |
| 4,782,946 | 11/1988 | Pollak | 206/223 |
| 4,816,232 | 3/1989 | Barrau et al. | 422/301 |
| 4,822,165 | 4/1989 | Schmalfuss et al. | 356/239 |
| 4,889,664 | 12/1989 | Kindt-Larsen et al. | 264/2.6 |
| 4,923,679 | 5/1990 | Fukasawa et al. | 95/46 |

(List continued on next page.)

FOREIGN PATENT DOCUMENTS

| | | | |
|---|---|---|---|
| 63-111909 | 5/1988 | Japan | 96/6 |
| 6-15254 | 1/1994 | Japan | 96/6 |
| 6-134210 | 5/1994 | Japan | 96/194 |
| 6-285301 | 10/1994 | Japan | 96/6 |
| 223773 | 8/1968 | U.S.S.R. | 96/194 |
| 447609 | 10/1972 | U.S.S.R. . | |
| 2097281 | 11/1982 | United Kingdom | 95/266 |

*Primary Examiner*—Duane S. Smith

[57] ABSTRACT

An apparatus is provided for removing and transporting articles, such as contact lens sections from a manufacturing line to inspection and packaging stations. The lenses are deposited in a transparent plastic primary package which carries the lenses through the inspection station and becomes part of the primary package when a cover is sealed thereto. The invention includes various assemblies, including lens transfer assemblies, deionized water filling and removal assemblies, a water degassing assembly, a lens inspection assembly, and a lens package sealing assembly. The lenses are removed from pallets at a post hydration station, transported and spatially redistributed, and deposited in the primary packages disposed on a second set of pallets. The packages on the second set of pallets are filled with degassed deionized water. The contact lenses and packages are then transported to an inspection station. After inspection, the lenses and packages are transported to a water removal assembly, and then to another transfer assembly. This transfer assembly separates those lenses which passed inspection from those which did not, and places those that did in a consolidating assembly. The lenses and packages are then filled with saline solution and a foil label is then sealed thereto to form the primary package.

13 Claims, 12 Drawing Sheets

U.S. PATENT DOCUMENTS

| | | | |
|---|---|---|---|
| 4,936,328 | 6/1990 | Yatabe | 134/66 |
| 4,936,329 | 6/1990 | Michael et al. | 134/57 R |
| 4,961,820 | 10/1990 | Shinagawa et al. | 156/643 |
| 4,985,722 | 1/1991 | Ushijima et al. | 354/319 |
| 4,986,290 | 1/1991 | Oguma et al. | 134/95 |
| 5,036,971 | 8/1991 | Seden et al. | 206/5.1 |
| 5,039,459 | 8/1991 | Kindt-Larsen et al. | 264/2.6 |
| 5,080,117 | 1/1992 | Yang | 134/188 |
| 5,080,839 | 1/1992 | Kindt-Larsen | 264/2.6 |
| 5,082,558 | 1/1992 | Burris | 206/5.1 |
| 5,094,609 | 3/1992 | Kindt-Larsen | 425/445 |
| 5,099,987 | 3/1992 | Bieri | 206/5.1 |
| 5,115,553 | 5/1992 | Sealey et al. | 29/563 |
| 5,117,849 | 6/1992 | Zimmerli | 134/573 |
| 5,143,660 | 9/1992 | Hamilton et al. | 264/1.4 |
| 5,161,559 | 11/1992 | Yoshihara et al. | 134/105 |
| 5,264,161 | 11/1993 | Druskis et al. | 264/2.6 |
| 5,290,134 | 3/1994 | Baba | 414/404 |
| 5,407,062 | 4/1995 | Shannon et al. | 206/5.1 |
| 5,467,868 | 11/1995 | Abrams et al. | 206/5.1 |
| 5,476,111 | 12/1995 | Andersen et al. | 134/58 R |
| 5,488,815 | 2/1996 | Abrams et al. | 53/425 |
| 5,578,331 | 11/1996 | Martin et al. | 425/445 |

APPARATUS AND METHOD FOR DEGASSING DEIONIZED WATER FOR INSPECTION AND PACKAGING

CROSS REFERENCE TO RELATED APPLICATIONS

This application is a continuation-in-part of U.S. Ser. No. 08/258,557 filed Jun. 10, 1994, now U.S. Pat. No. 5,578,331, and U.S. Ser. No. 08/432,957 filed May 1, 1995, now U.S. Pat. No. 5,649,410, both of which are entitled AUTOMATED APPARATUS AND METHOD FOR PREPARING CONTACT LENSES FOR INSPECTION AND PACKAGING.

FIELD OF THE INVENTION

The present invention relates generally to the field of manufacturing ophthalmic lenses, especially molded, hydrophilic contact lenses, and more specifically to an apparatus and method for degassing deionized water for use in inspection and packaging of contact lenses.

DESCRIPTION OF THE PRIOR ART

The molding of hydrophilic contact lenses is disclosed in U.S. Pat. No. 4,495,313 to Larsen; U.S. Pat. No. 4,640,489 to Larsen, et al.; U.S. Pat. No. 4,680,336 to Larsen et al.; U.S. Pat. No. 4,889,664 to Larsen et al.; and U.S. Pat. No. 5,039,459 to Larsen et al., all of which are assigned to the assignee of the present invention.

These prior art references disclose a contact lens production process wherein each lens is formed by sandwiching a monomer or monomer mixture between a front curve (lower) mold section and back curve (upper) mold section, carried in a two by four mold array. The monomer is polymerized, thus forming a lens which is then removed from the mold sections and further treated in a hydration bath and packaged for consumer use.

U.S. Pat. Nos. 5,080,839 and 5,094,609 disclose respectively a process for hydrating contact lenses and a chamber for hydrating contacts lenses formed with a monomer or monomer mixtures disclosed in the forgoing patents. The process disclosed in these patents significantly reduces the thruput time by hydrating the lens and releasing the lens from the mold cavity with deionized water and a small amount of surfactant without any salts, so that the time consuming ionic neutralization of the polymer from which the lens blank is made does not occur during the hydration process. When deionized water is used, the final step of the process is to introduce buffered saline solution into the final package with the lens and then seal the lens within the package so that the final lens equilibrium (ionic neutralization, final hydration and final lens dimensioning) is accomplished in the package at room temperature or during sterilization.

U.S. Pat. No. 4,961,820, also assigned to the assignee of the present invention, discloses a final package for a contact lens, wherein the package is formed from a transparent polypropylene blister and a foil laminate that is heat sealed thereto.

While U.S. Pat. Nos. 5,080,839 and 5,094,609 contemplate that the entire hydration process and transfer to final packaging may take place in a fully automated fashion, and while the chamber and process described in the foregoing patents enabled automated handling of the lens during hydration, suitable automated equipment to prepare the lenses for inspection and to handle the lenses at high production rates to implement the methods thereof in a fully automated apparatus was not readily available or taught by the prior art.

SUMMARY OF THE INVENTION

Recent developments in the inspection of contact lenses produced in accordance with the foregoing methods has enabled automated lens inspection, as taught in U.S. Ser. No. 994,564, now abandoned, entitled "Lens Inspection Method and Apparatus", assigned to the assignee of the present invention. Further, recent developments in the hydration and automated handling of wet contact lenses, as taught in U.S. Ser. No. 258,556, now U.S. Pat. No. 5,476,111, "Automated Method and Apparatus for Hydrating Soft Contact Lenses", also assigned to the assignee in the present invention, has enabled automatic robotic handling of lenses during hydration, and prior to the inspection thereof by the automated lens inspection system.

It is an object of the present invention to provide an automated apparatus for handling and preparing contact lenses for inspection. It is further an object of the present invention to provide an automated apparatus for handling and preparing contact lenses for inspection and packaging wherein the lenses are inspected and packaged in the same carrier.

It is further an object of the present invention to provide for transfer of the lens between carriers with degassed and deionized water to facilitate the inspection thereof in the automatic inspection means. It is further an object of the present invention to provide a device for removing air bubbles that may have formed on the surface of the lens prior to the inspection thereof in the automatic lens inspection system.

It is further an object of the present invention to provide an improved method of inspecting molded contact lenses wherein the lenses are inspected in deionized and degassed water to minimize the formation of air bubbles which would create false negative automatic lens inspection data.

It is further an object of the present invention to provide an improved method for manufacturing soft contact lenses wherein the lenses are first molded in disposable contact mold frames, hydrated and inspected in degassed and deionized water, and then packaged in a saline solution to enable the time consuming ionic neutralization of the polymerized lens to occur in the final package. It is further an object of the present invention to provide the foregoing method of manufacturing with a consolidation step for removing defective lenses from the line of inspected lenses prior to packaging.

It is another object of the present invention to provide for inspection of the contact lens in degassed and deionized water and to provide for the automatic removal of the deionized water following inspection thereof.

Finally, it is an object of the present invention to provide for a transfer of the contact lenses from the hydration station to the inspection station with a bubble blow off station to remove air bubbles that would otherwise create false negative automatic lens inspection reports.

While the invention is described with particular reference to molded contact lenses wherein the lens has been molded between a first and second mold half, as described in U.S. Ser. No. 258,654 "Consolidated Contact Lens Molding" it is understood the present consolidation apparatus is equally suitable for the consolidation of lenses formed by lathe cutting wherein the hydrogel is maintained at a dry state while the desired optical surfaces are cut and polished.

Further, the apparatus of the present invention may also be used in consolidating spin cast lenses which subject a liquid monomer to centrifugal force in a mold which has the same shape as the desired optical surfaces of the lens.

BRIEF DESCRIPTION OF THE DRAWINGS

The foregoing objects and advantages of the present invention for an apparatus and method for degassing deionized water for inspection and packaging which may be more readily understood by one skilled in the art with reference being had to the following detailed description of the preferred embodiments, taken in conjunction with the accompanying drawings, wherein like elements are designated by identical reference numerals throughout the several views, and in which:

FIG. 7($b$) is a cross-section and diagrammatic illustration of a bubble blow off mechanism for removing air bubbles from the contact lenses that might otherwise create false negative automatic lens inspection results.

DETAILED DESCRIPTION OF THE PREFERRED EMBODIMENTS

The present invention was designed for and is particularly adapted for use in the post hydration processing section of an automated contact lens production facility. Contact lenses molded in an automated production line, such as that described in co-pending application U.S. Ser. No. 258,654 entitled "Consolidated Contact Lens Molding"; hydrated in a hydration system as described in U.S. Ser. No. 258,556, now abandoned, entitled "System for Handling Contact Lenses During Hydration"; and automatically inspected as described in U.S. Ser. No. 994,564, now abandoned, entitled "Lens Inspection Method and Apparatus" are particularly benefited by the present invention.

POST HYDRATION PROCESSING

The present invention envisions a multi-purpose disposable lens package carrier which transports a contact lens during inspection thereof, and serves as a portion of the final packaging after inspection.

Figure 1:
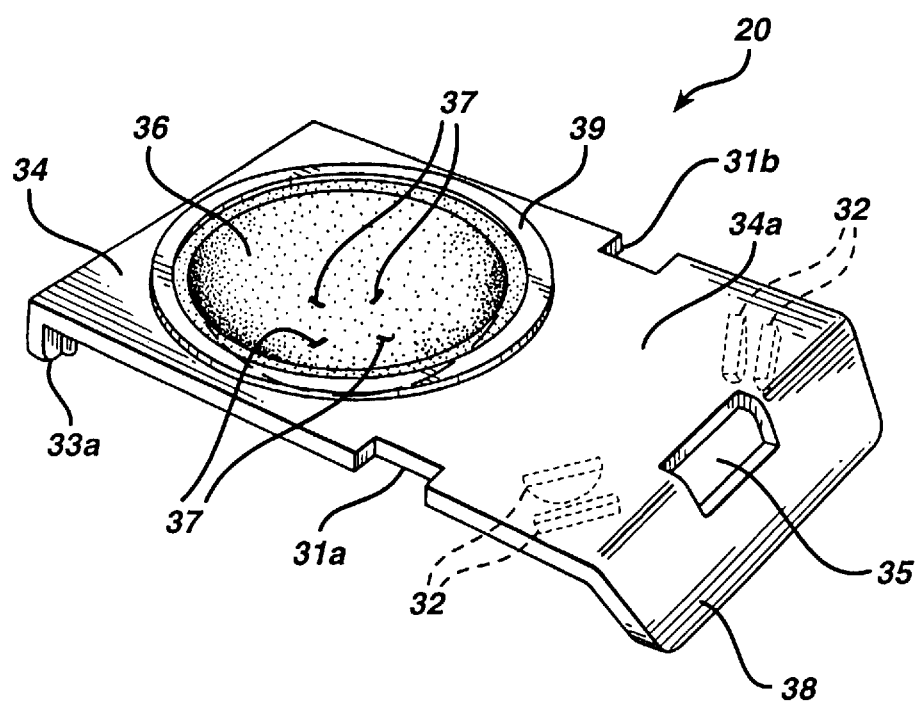
FIG. 1 is an isometric view of a contact lens carrier which serves as both an inspection carrier, and a portion of the final contact lens package.

A suitable package carrier 20 is illustrated in FIG. 1 and is formed from injection molded or thermal formed plastic sheet material, such as polypropylene and includes a planar essentially rectangularly shaped base member 34 having an angularly depending wall portion 38 at one end thereof forming a first flange member and a pair of registration flanges 33($a$),33($b$), one of which is visible in FIG. 1, at the other end thereof which are used to align the package carrier for robotic handling. This package carrier is more fully described in copending application U.S. Ser. No. 995,607, now abandoned, entitled "Ophthalmic Lens Package also assigned to the assignee of the present invention, the disclosure of which is incorporated here by reference thereto. Registration notches 31($a$),($b$) are provided on either side of the base 34 to cooperate with registration pins on various support pallets used in the processing and packaging operations to register the package carrier and lens for further handling or treatment. Offset from the center of the package is a cavity 36 integrally formed therein which is of an essentially semi-spherical configuration, generally in conformance with a curvilinear shape of a contact lens (not shown) which is adapted to be stored therein in a sealed condition while immersed in a suitable sterile aqueous solution in a manner similar to that described in U.S. Pat. No. 4,691,820 to Martinez; which is assigned to the assignee of the present invention, the disclosure of which being incorporated herein by reference thereto. The height "h" of flange member 38 depending from the planar base member 34 is complimentary to the height or depth of cavity 36, and provides for self alignment of the package carrier in cooperation with depending flanges 33($a$),($b$) on specially configured pallet carriers, as will hereinafter be described. Depending flange 38 is also used in the final packaging of the product in cooperation with a plurality of generally "chevron-shaped" ridges 32, which will subsequently assist in supporting the cavity structure of an inverted and superimposed package carrier when said packages are to be cartoned for final distribution.

The cavity 36 may also include a plurality of tick marks 37 which are used to assist in holding a contact lens in the centered position in the cavity during the removal of deionized water at one of the post hydration processing stations. The package carrier is also equipped with an annular flange 39 which is used for heat sealing a foil laminate cover in order to provide a hermetic seal for the contact lens during final distribution. A cut-out 35 is used to facilitate gripping the flange 38 and the package when the cover stock or foil laminate is removed by the consumer to use the lens.

Base member 34 also includes a smooth planar surface 34($a$) to provide a suitable engagement zone for vacuum grippers on the upper side, which may be used to transport the package carrier during various stages of the operation.

Figure 2:
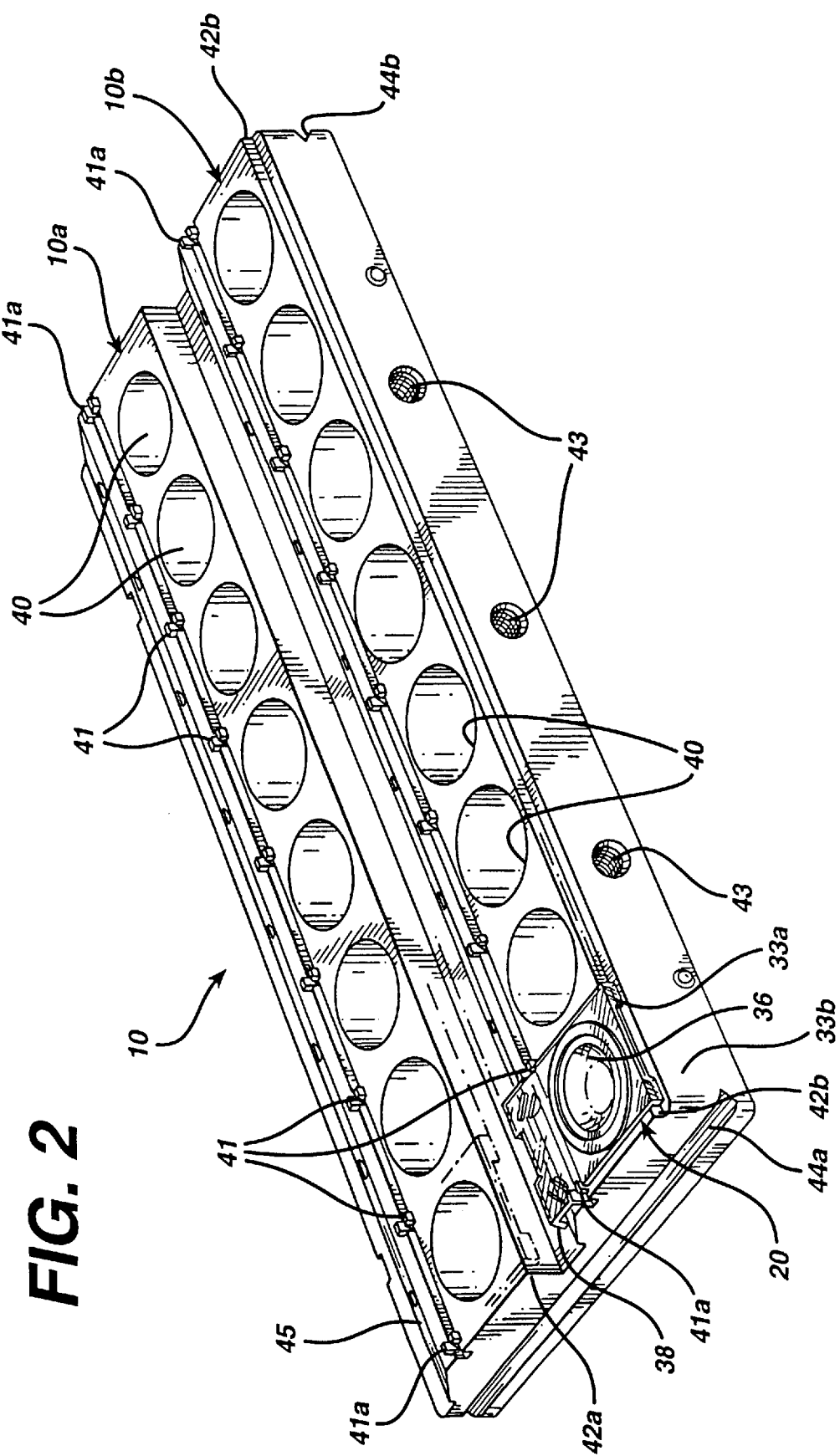
FIG. 2 is an isometric view of an inspection carrier used to transport a plurality of the contact lens carriers illustrated in FIG. 1 through the automated lens inspection system.

An inspection carrier for transporting the package carriers through the automated lens inspection system is illustrated in FIG. 2. The inspection carrier 10 includes a first and second row 10(a),10(b) of cavities 40 which receive the bowl 36 of the package carrier and provide an optical sight path for the automated lens inspection system. Each of the intermediate registration pins 41 engage a package carrier on either side, with the end registration pins 41(a) engaging a single package. These registration pins engage the registration notches 31(a),(b) in the package carriers and provide for precise registration of the package carrier in the longitudinal dimension of the inspection carrier while a pair of hard edges 42(a),42(b) provide a reference point for the downwardly descending flanges 33(a),33(b), which together with pins 41 register the carrier package against rotational skewing. The inspection pallet 10 is further provided with three registration openings 43 on either side of the pallet which are used to transport the pallet through the automatic lens inspection station and to lock the pallet in place during loading and unloading of the package carriers. The inspection pallet is further provided with a pair of grooves 44(a),44(b) which provide a positive grip for an overhead transport mechanism that places and then removes the inspection pallet from the automatic lens inspection system. A pair of slanted faces 45 provide clearance for the downwardly descending flange member 38 of the package carrier 20.

As illustrated in FIG. 1, the polypropylene lens carriers 20 serve a dual purpose. First, to provide a carrier for the inspection of the lens by the automated lens inspection system, and secondly, to provide a receptacle for the final packaging of the lens for distribution to end use consumers. These package carriers are molded in predetermined array, typically in a 4×4 cluster of sixteen package carriers per mold cycle, and removed from the injection mold by a robotic transfer means.

The package carriers 20 are then placed on an inspection pallet 10 at a pallet loading station. In the preferred embodiment the package carriers are molded in a 4×4 array to maximize the efficiencies inherent in such an array for molding, but are transported in the inspection pallet 10 to form a 2×8 array. The loaded pallet 10 is then moved by conveyor to a deionized water injection station 16 illustrated in FIGS. 10 and 11, wherein each of the package carriers transported on the inspection pallet are partially filled with degassed and deionized water. The inspection pallet is then transferred by a push conveyor to a lens loading area where it may be batched with a second pallet to provide a contiguous loading area with thirty-two package carriers, each of which has been dosed with degassed and deionized water.

DEIONIZED WATER DEGAS

The present invention utilizes degassed and deionized water with a small amount of surfactant therein as an inspection media for the Automatic Lens Inspection System described in U.S. Ser. No. 994,564, now abandoned.

When only deionized water is used in the package carrier bowl, friction or hydrophobic attraction between the contact lens and the surfaces of the carrier that form the recesses may occasionally prevent the lenses from moving or sliding completely into the desired, predetermined positions. For example, in one known process, contact lenses are formed from a liquid hydrogel monomer, which is polymerized in the presence of an inert diluent such as boric acid ester, as described in U.S. Pat. No. 4,495,313. The inert diluent fills up the spaces in the hydrogel lens during polymerization, and the diluent is subsequently exchanged for deionized water during a hydration process.

After this hydration process is completed, small amounts of the acid groups may remain on the lens surface. When the lens is placed inside the recess of the lens carrier, these acid groups may cause the lens to stick to the surface of the bowl of the carrier. Without freedom of movement, the lens might not move completely into the desired predetermined position. When this happens and the lens is subsequently inspected using an automatic Lens Inspection System, the lens may be rejected for being outside the field of view, or may otherwise be erroneously identified as irregular or imperfect.

In application U.S. Ser. No. 258,266, now abandoned, entitled "Surfactants as Centering Agents for Optical Inspection", the disclosure of which is incorporated herein by reference thereto, a solution to this problem was described in which a small amount of surfactant was added to the deionized water. The surfactant reduces the friction and retards the hydrophobic attraction between the lens and the surface of the holder forming the recess, helping to insure that the lens is pulled into the desired, predetermined position.

Any suitable surfactant may be used in the practice of the invention. For example, the surfactant may be polyoxyethylene 20 sorbitan monooleate, more commonly known as Polysorbate 80, or tween 80 or tween $80k^c$. It has been found that the addition of tween 80 at a concentration as low as 25 parts per million parts of solution allows the lens to move in package carrier 20 without sticking. Larger amounts of the surfactant may be used, and for example, the weight percent concentration of the surfactant in the solution may be between 0.01%. and 5.0% The surfactant may be mixed in any suitable liquid carrier, such as deionized water, to form the desired solution.

Preferably, the surfactant concentration in solution is in the lower end of the above-given range, and for example, the surfactant concentration may be below fifty parts per million parts of deionized water. Using the surfactant at this lower concentration helps to avoid, or to reduce, any foaming or bubbling of the surfactant in the solution and helps to reduce subsequently the surfactant concentration below a predetermined level.

Degassed water is preferred to the prevent the formation of air or gas bubbles when the water emerges from a pumped high pressure fluid line into a low pressure (atmospheric) environment. When deionized water which has not been degassed is used, small air bubbles may form in the package before the lens is transferred or, on the contact lens when it is transferred to the package carrier. These bubbles are formed from dissolved gasses in the deionized water which are "seeded" by the lens or a small irregularity in the package carrier surface.

Figure 3:
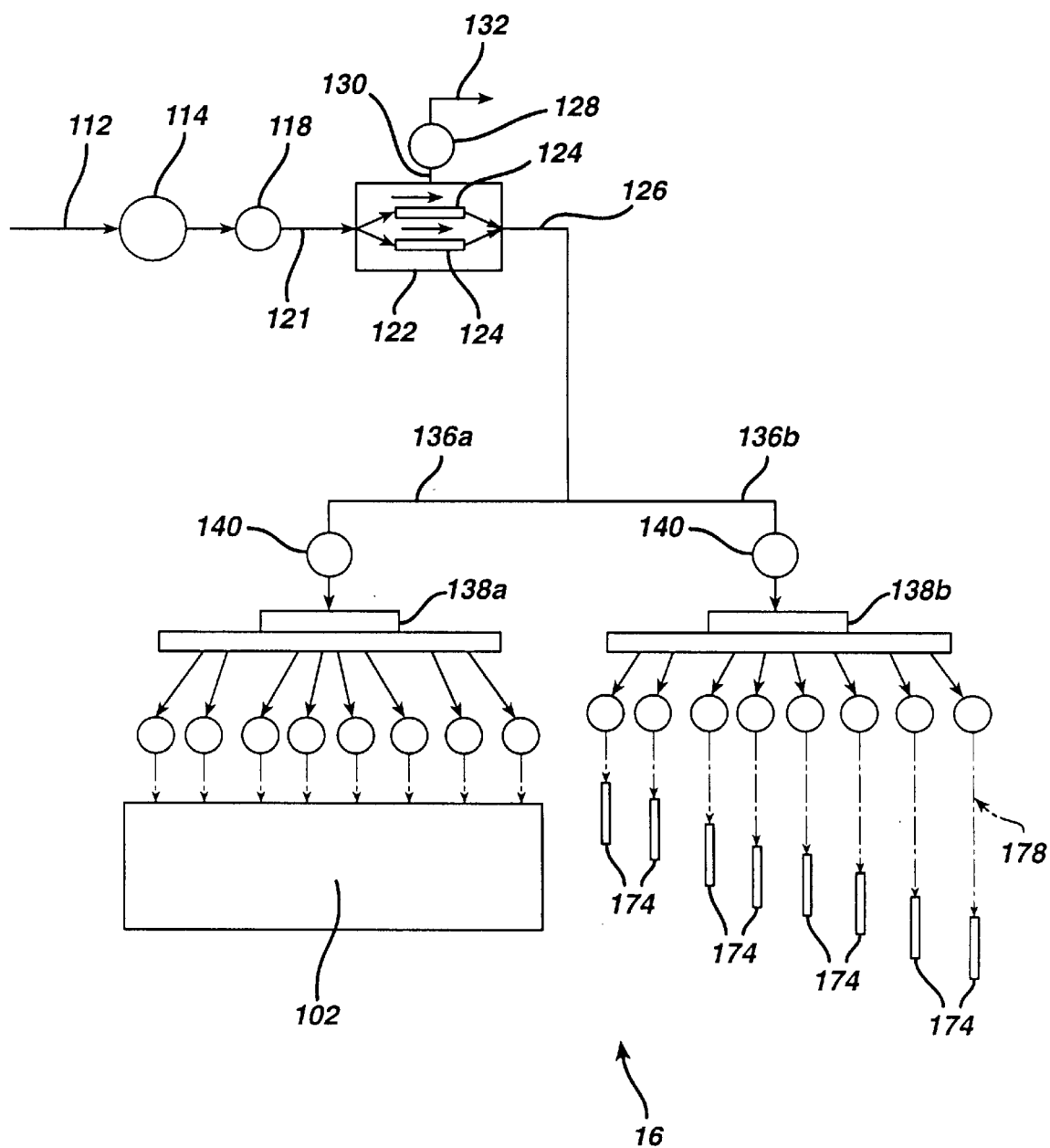
FIG. 3 is a diagrammatic illustration illustrating the components of the deionized water degassing system of the present invention.
Figure 4:
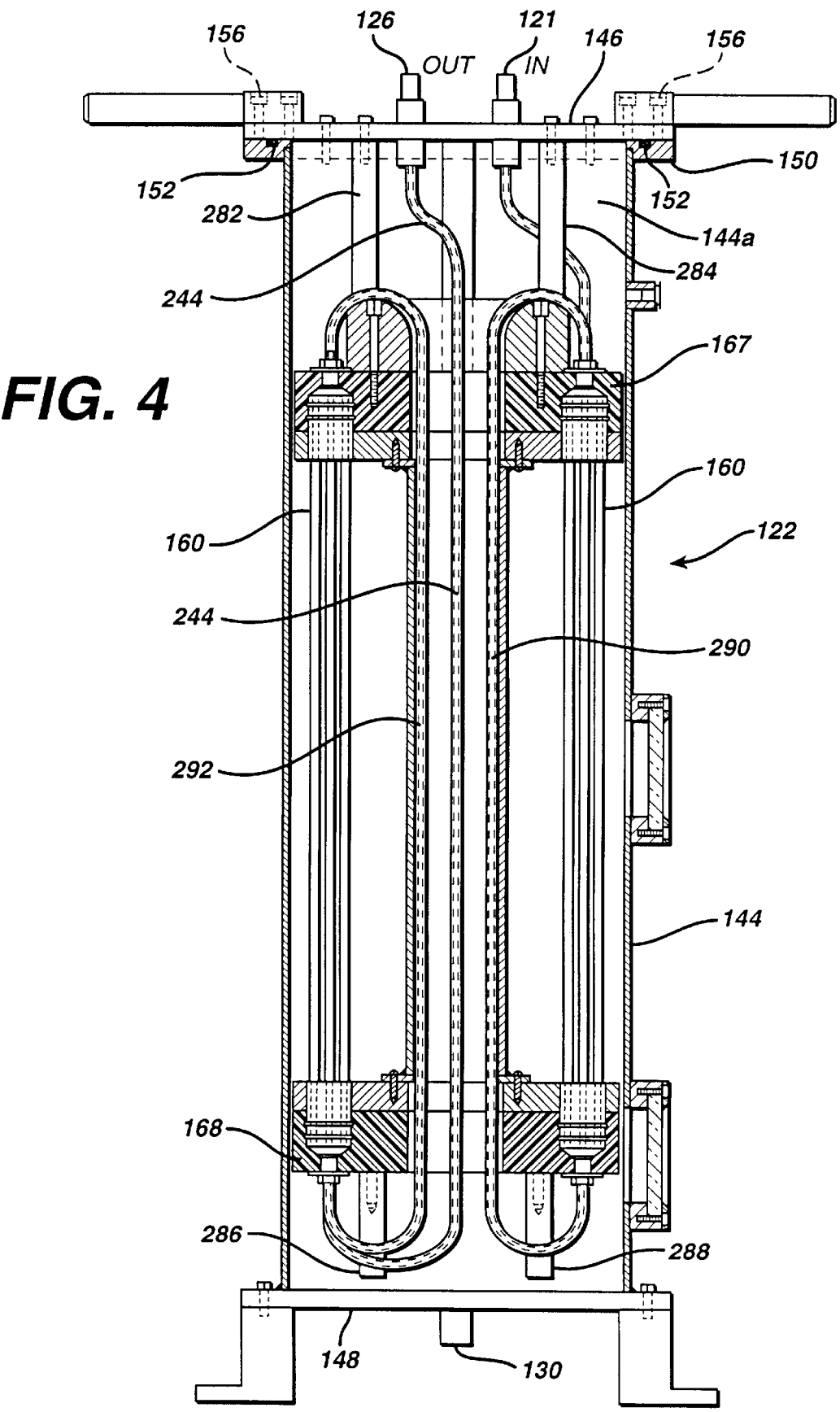
FIG. 4 is a detailed elevation view illustrating in section the degas vacuum tank used to degas the deionized water.
Figure 5:
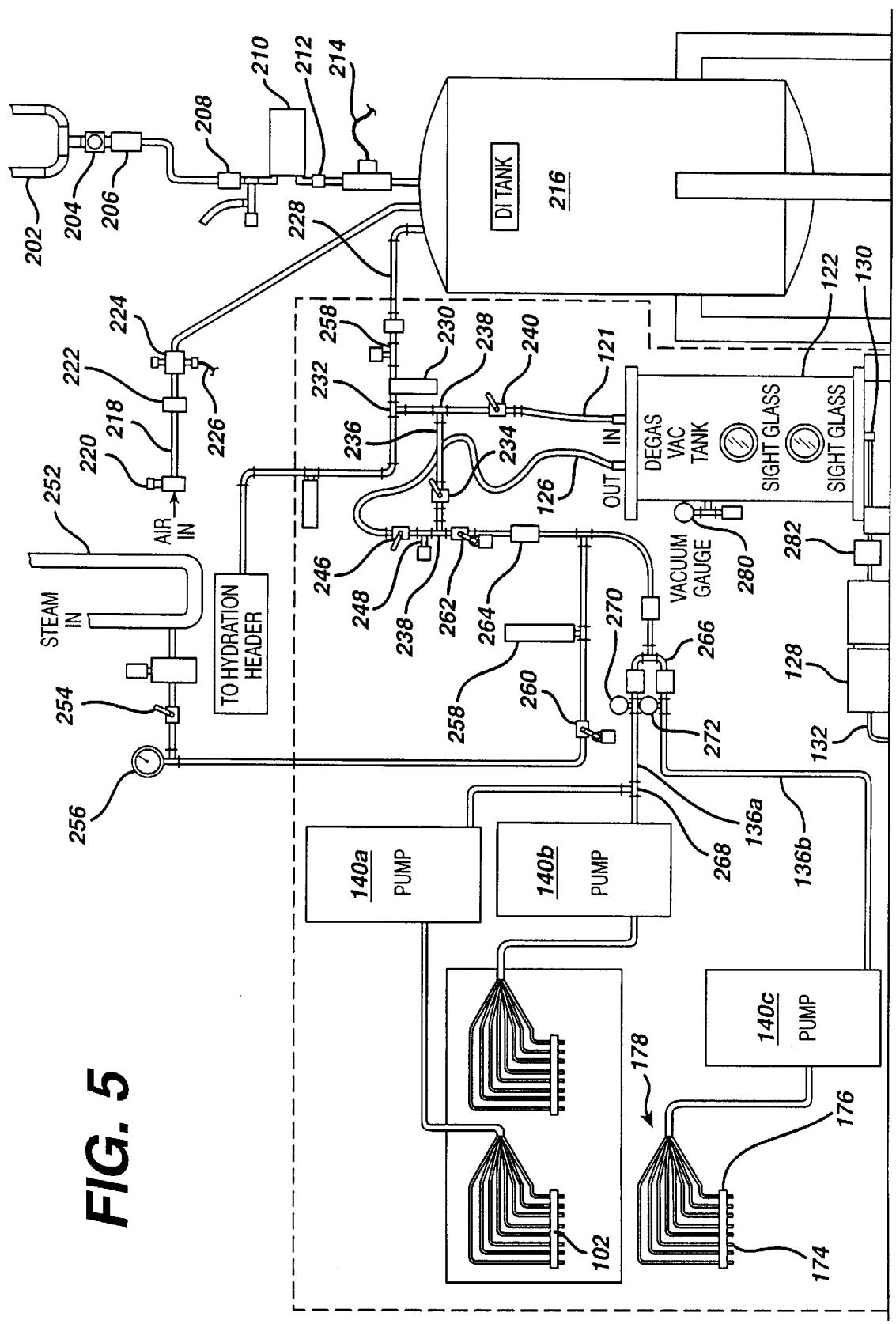
FIG. 5 is a schematic view of the mechanical and fluid flow devices used in the present invention.

The apparatus for degassing the deionized water is illustrated in FIGS. 3–5. FIG. 3 is a diagrammatic illustration of the degas module, while FIG. 4 is a detailed cross sectional and elevation view as the degass unit 122. Deionized water is provided through input line 112 from a deionized water source, which may be the same source as that used for hydration. If drawn from a container, an air blanket in the deionized water tank or an optional pump 114 may be provided.

The deionized water then passes through filter 118 in order to remove extraneous particulate contaminates that may be present in the water.

The deionized water is then provided to the inlet 121 of the degas unit 122. Within the degas unit, the deionized water is divided among a plurality of tubes 124 arranged in manifolds, and then recombined into a degas unit discharge 126. The degas unit is operated under a low ambient pressure typically from 4 to 25 torr which is provided by vacuum pump 128. This vacuum pump is attached to the degas unit 122 by line 130 and discharges the excess air from the degas unit by way of line 132.

After the deionized water exits degas unit 122 by discharge line 126, it passes through line 136(a),(b) through a precision dose pumps 140 into manifolds 138(a),(b). The manifolds are used as a common source to supply a plurality of nozzles individual contact lens package carriers at the dosing station 16 and the robotic transfer array 102 mounted on robotic transfer device 100. The pumps 140 used to pump the degassed and deionized water to manifold 138 are F.M.I. pumps (Fluid Metering, Inc., Oyster Bay, N.Y.) that are mounted to pump drive units manufactured by Oyster Bay Pump Works, Inc., Oyster Bay, N.Y. These pumps provide precision doses of degassed and deionized water solution to dose the package bowls to thereby reducing bubble formation and lens sticking, to avoid overfilling (i.e. water on the sealing area of the package) and to promote the proper water level for the inspection system.

Turning now to FIG. 4, there is shown in greater detail the monomer degas unit 122. The degas unit is comprised of a pressure boundary consisting of an outer cylindrical wall 144, a top plate 146 and a bottom plate 148. Defined within the bottom plate 148 is a port 130, which is connected to vacuum pump 128, as illustrated in FIG. 5.

Top plate 146 is attached to the cylindrical side wall 144 by means of a flange 150 and an O-ring 152 which is compressed between the flange and the top plate. Compression of the O-ring and attachment of plate 146 to flange 150 is accomplished by bolts 156 that attach the plate to the flange.

Passing through top plate 146 is the water inlet line 121. This inlet line passes through the top plate 146, divides within the chamber 144(a) by means of a "Y" connector into two or more lines, preferably of equal length to provide equal back pressure resulting in equal flow through each branch. Each of these lines is connected to a silicon manifold 160. Arranged within the degass tank are two to ten silicon manifolds 160, each manifold having ten tubes which are permeable to gas. In the preferred embodiment of the invention six manifolds are provided. Manifolds 160 are arranged in a parallel-serial array, with multiple sets of two parallel manifolds each connected in series.

The internal structure of the degas unit is mounted in a pair of delrin blocks 167,168 which support both the manifold piping and the gas permeable manifolds 160. The delrin blocks 167,168 of the degas unit may be suspended from top flange 146, via hangers 282, 284 which suspend the top block and hangers 286, 288 which suspend the bottom block. The flow path is from top down, and the water from the first parallel array is returned to the top for the second array with tubing member 290 and from the second to the next parallel array via tubing number 292. The degassed water is finally returned to top outlet via outlet piping 244 to discharge line 126.

During the time of residence in the silicon manifolds, dissolved gasses migrate out of the deionized water through the individual tube walls of the tubes in manifold 160, drawn out by the vacuum generated by pump 128 and communicated through chamber outlet 130. As the water approaches the top of the chamber it is essentially free of dissolved gasses.

Figure 12:
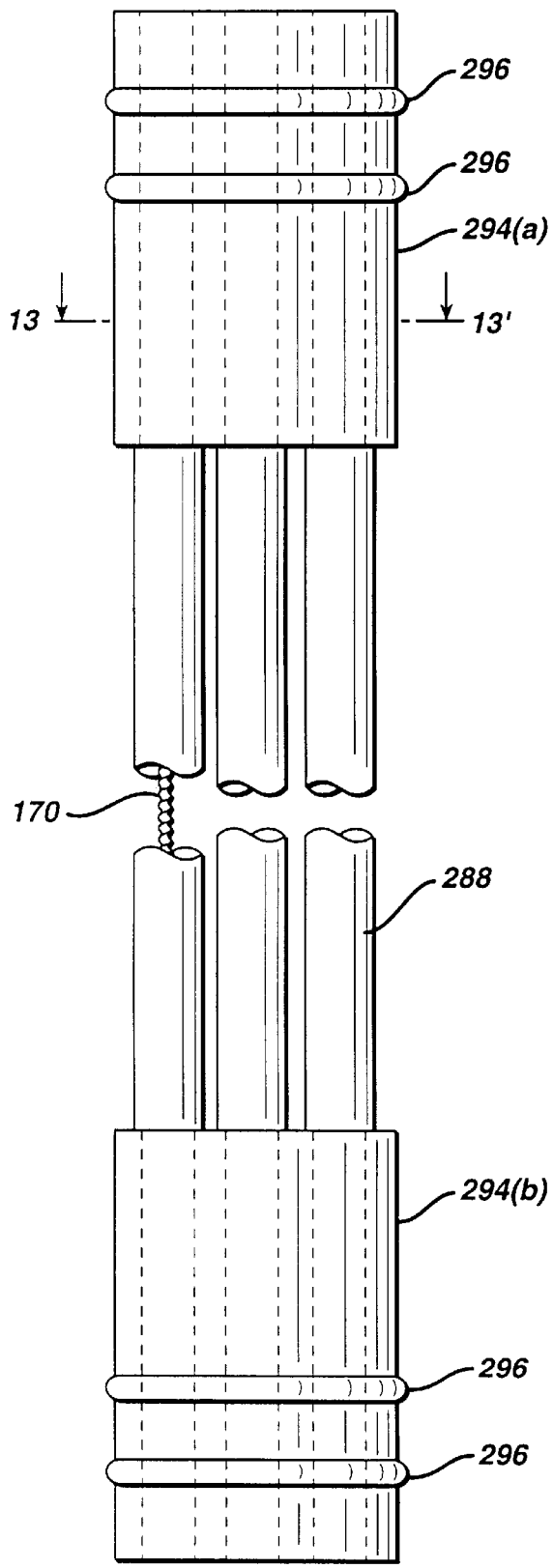
FIG. 12 is an elevation view of one of the degass manifolds used in the degass vacuum tank illustrated in FIG. 4 of the drawings.
Figure 13:
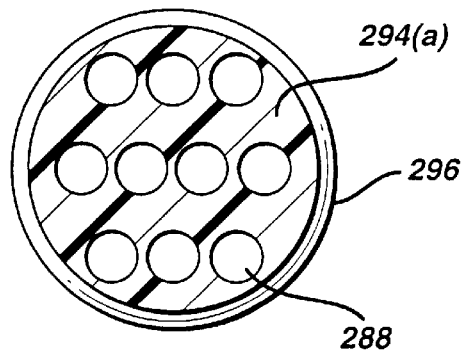
FIG. 13 is a cross section taken along section line 13–13' of FIG. 12.

One of the manifolds 160 is illustrated in FIGS. 12 and 13, wherein FIG. 12 is an enlarged and partial elevation view, and FIG. 13 is a cross-section taken along section line 13–13'. Each of the manifolds contains 10 individual tubes or lumens 288 arranged in a 3-4-3 array, as illustrated in FIG. 13. The individual tubes 288 are mounted in manifold mounting blocks 294(a), 294(b) which include integral sealing members 296 to seal the manifold to the delrin mounting blocks 167, 168.

Statics mixers 170, one of which is illustrated in FIG. 12, are provided in each of the tubes in manifolds 160 to increase the efficiency of mass transfer. These static mixers are made of Delrin, ¼ inch in diameter and 6 inches long, as produced by Koflo, Inc. of Carrie, Ill.

The preferred material for the gas permeable tubing is STHT tubing produced by Sanitech Inc. of Andover, N.J. from Q74780 medical grade silicone rubber manufactured by Dow Corning of Midland, Mich.

The apparatus is arranged so that each manifold 160 contains ten tubes, each having an inner diameter of ⅛" to ½" with a preferred inner diameter of ¼" and a wall thickness of ¹⁄₁₆th to ¹⁄₃₂nd inch, with a preferred thickness of ¹⁄₃₂ inch, having a 80 durometer hardness.

The header tubes at the top and bottom of the tank may also be made of a silicon, or may be made of an impervious material. They are of the same length in order to avoid pressure differences which could result in flow imbalances. The header tubes are then connected in a "Y" fashion to provide a single degas unit outlet 126.

FIG. 5 is a schematic view of the mechanical and fluid flow devices used in the present invention. As illustrated in FIG. 5, the deionized water is supplied from a recirculating supply line 202 through shut-off valve 204, filter 206, flowmeter 208, and an electronically actuated air-operated valve 210 which provides for electronic control of the deionized water supply. A one-way check valve 212 and the manual shut-off valve 204 provide isolation for the recirculating deionized water supply in conduit 202. A supply line 214 may provide a small metered amount of a surfactant such as tween 80 as was previously described.

The deionized water is stored in a holding tank 216 and is pressurized by an air blanket provided by a supply system through conduit 218 having a pressure regulator 220, an air filter 222, and an electronically actuated solenoid valve 224 having a quick exhaust vent 226.

In the normal operation of the device, the deionized water in tank 216 is pressurized with a blanket of air maintained at 10–20 psi, and preferably at 15 psi. The deionized water is withdrawn from the deionized water tank 216 by virtue of conduit 228 through filter 230 to a first manifold T 232 which divides the deionized water into two process streams, one of which provides a water supply for the hydration apparatus described in U.S. Ser. No. 256,556, now U.S. Pat. No. 5,476, 111, entitled "Automated Method and Apparatus for Hydrating Soft Contact Lenses" referred to previously.

A bypass system including bypass valve 234 and shunt conduit 236 is connected into the system by virtue of a pair of conduit T's 238. In normal operation bypass valve 234 is closed and the deionized water proceeds through T 238, shut-off valve 240 and inlet tubing 121 to the degas tank 122 of the present invention. Deionized and degassed water is piped from the degass vacuum tank 122 through outlet conduit 244 and valve member 246 for use in supplying the deionized and degassed water to the lens transfer nozzles and the inspection packages in accordance with the present invention.

Sample ports 248 and 250 are provided for drawing test samples when desired. The use of flanged service connectors on the inlet tubing 242 and outlet tubing 244, and the provision of inlet and outlet valves 240, 246 and the bypass valves 234 enable the system to be bypassed through shunt 236 for servicing of the degass vacuum tank 122, and thus maintain continuous operation of the production line, even during servicing.

A recirculating steam supply 252 is provided with a shut-off valve 254, a pressure gauge 256 and a filter 258 to sterilize the distribution tubing on a periodic basis as described in U.S. Ser. No. 432,927 entitled "On-Line Steam Sanitization", also assigned to the assignee of the present invention. During normal operation, the steam supply is isolated from the deionized and degassed water supply by means of locked shut-off valve 260. During sterilization, the steam supply is isolated from the degass chamber 122 and the deionized water supply tank 216 by virtue of normally locked valve 262. These two valves isolate the distribution system and prevent steam from entering the degass vacuum tank and the deionized water tank during sterilization of the distribution system. A one-way check valve 264 is also provided to ensure that neither deionized water nor steam enters the system during sterilization of the distribution system.

The output of the degas system is split via a first T 266 and a second T 268 to provide the three primary systems of the present invention with degassed and deionized water. Pressure gauges 270 and 272 are provided to measure pressure in each of the major systems. A pair of metered precision pumps 140(a) and 140(b) pump the degassed and deionized water to the lens transfer nozzles illustrated in FIGS. 6–9 to be used in the transfer of lenses from one system to the next. A third precision metering pump 140(c) is provided to pump the degassed and deionized water to a manifold 178 and a plurality of nozzles 174 as further illustrated in FIG. 10. These nozzles provide precision doses of degassed and deionized water to palettes 10 filled with a plurality of inspection package carriers 20 previously described and illustrated with respect to FIG. 1.

The degass vacuum tank 122 includes a vacuum gauge 280, a vacuum port 130, a pressure sensitive switch 282, a vacuum pump 128 and an exhaust 132, which exhausts both air and any expressed deionized water to a drain system. As indicated previously, the tank is normally maintained at 4 to 25 torr via the switched vacuum pump 128. In normal operation, a small amount of deionized water is expressed through the walls of silicon tubes 160 in the degass unit, and vacuum pump 128 is a diaphragm pump which is capable of handling small amounts of water during normal operation.

PRE-INSPECTION PREPARATION

The present invention is particularly adapted for use in conjunction with the invention disclosed in U.S. Ser. No. 258,556, now U.S. Pat. No. 5,476,111, entitled "Automated Method and Apparatus for Hydrating Soft Contact Lenses", assigned to the assignee of the present invention, the disclosure of which is incorporated herein by reference thereto.

Figure 6:
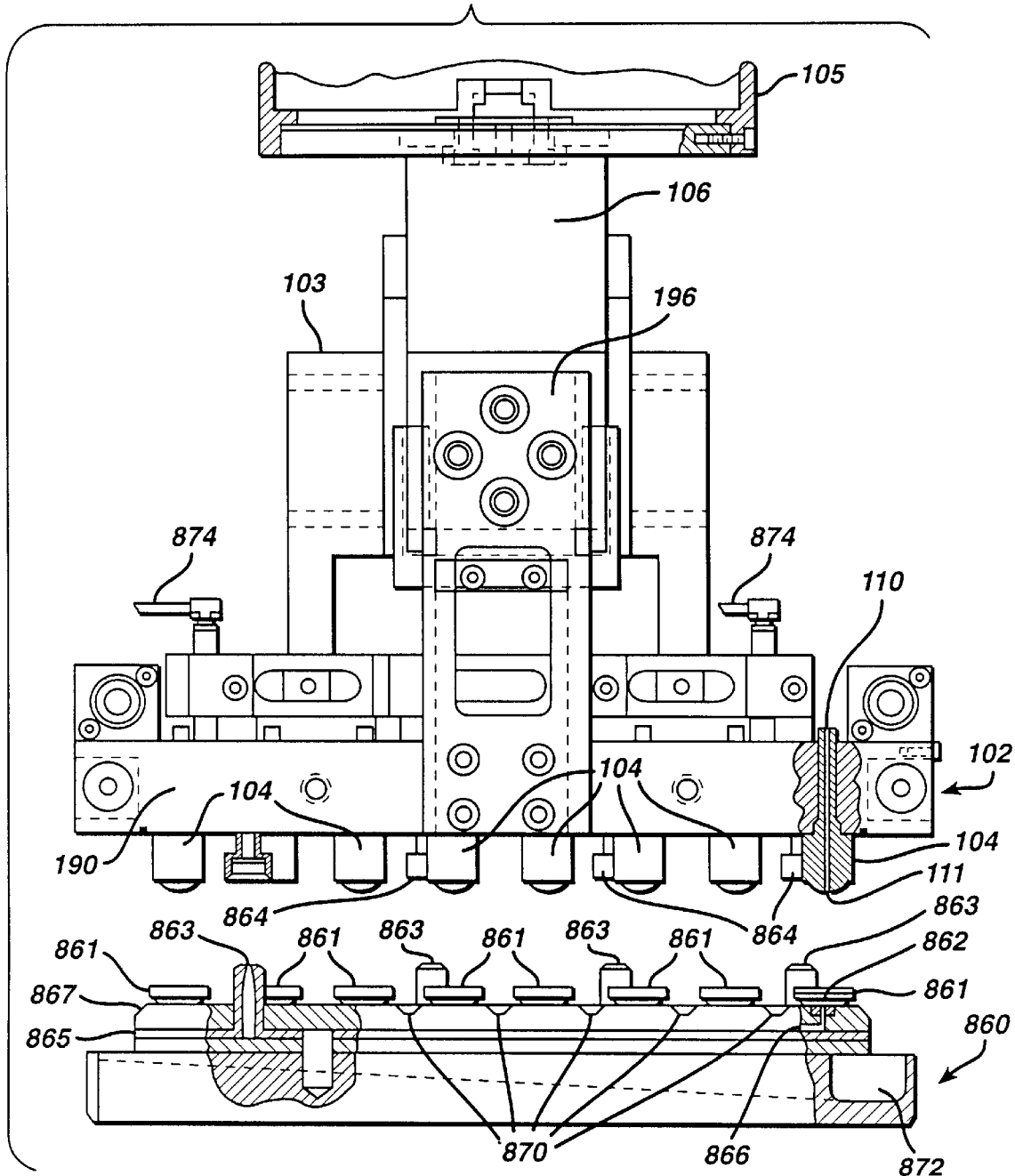
FIG. 6 is a plan view of an articulated robotic transfer head having an adjustable array of convex lens carriers positioned immediately above a hydration carrier having a plurality of contact lenses therein.

As illustrated in FIG. 6, a hydration carrier 860 emerges from the hydration apparatus to a transfer position having a plurality, e.g., thirty-two contact lenses therein, with a single lens carried in each of the convex lens carriers attached thereto. An articulated robotic transfer device having an adjustable 4×8 array 102 of convex lens carriers then positions the array over the second hydration carrier 860(a) as illustrated in FIGS. 6 and 7(a).

Figure 7A:
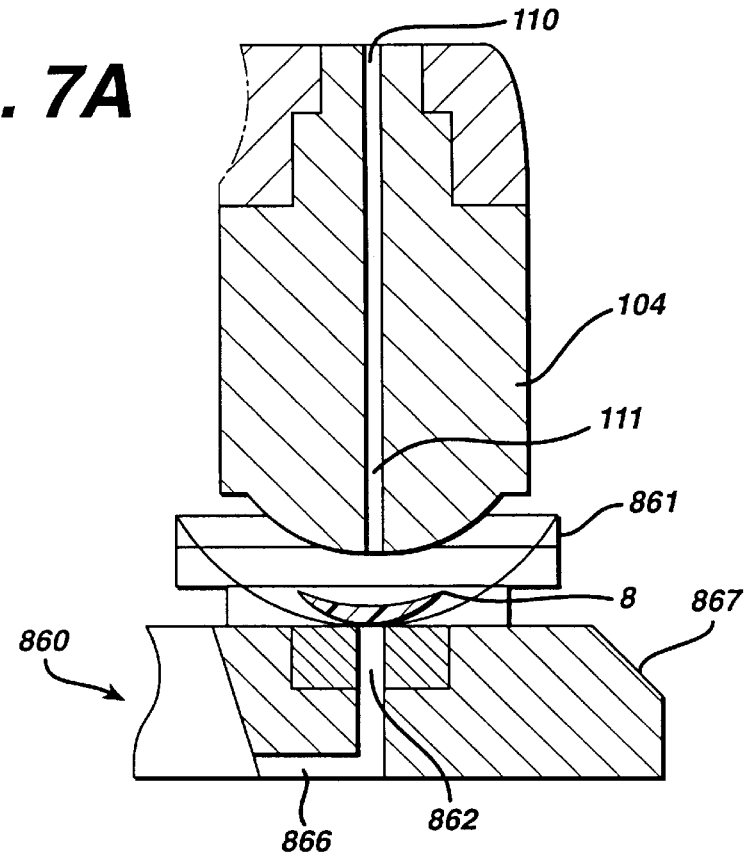
FIG. 7($a$) is a cross-section and diagrammatic illustration of the transfer of a wet contact lens from the concave lens holding surface of a hydration carrier to the convex holding surface of the articulated robotic transfer head.

As illustrated in FIG. 7(a), a single contact lens 8 is carried within the concave lens carrier 861 and is positioned immediately below a convex lens carrier element 104 mounted on the 4×8 array 102. The concave carrier 861 includes at least one port 862 for introducing a fluid between the surface of the concave lens carrier element, and the lens 8. The fluid is supplied through a channel 866 cut into the lower side of upper plate member 867, which communicates with a fluid manifold and a plurality of upstanding fluid connectors 863 which extend above the surface of the concave lens carrier elements 861 as best illustrated in FIG. 6. The fluid connectors 863 are adapted to engage fluid couplings 864 formed on the underside of the 4×8 array 102. Each of these couplings is connected to a fluid conduit 874 which supplies a transfer fluid for the transfer of the contact lens 8 from the concave lens holding means 861 to the convex lens holding means 104.

In the embodiment illustrated in FIG. 6, and in particular for the transfer of contact lenses from the hydration carrier 860 to the robotic array 102, a pneumatic fluid transfer is desired, and thus conduits 874 provide pressurized air to the coupling members 864 which in turn supply the pressurized air to fluid coupling 863 to the channel passageway 866, and the port 862.

As illustrated in FIG. 7(a), the contact lens 8 is still wet having recently been hydrated and flushed in the hydration station. Further, the lens has been hydrated with deionized water having a small amount of surfactant therein which may be advantageously employed to promote the handling of the wet contact lens by centering the lens within the concave surface of lens holding means 861. When the air pressure lines 874 are actuated, a puff of air will emerge through the port 862 and lift the contact lens upwardly from the surface of the concave carrier and into engagement with the convex lens carrier element 104. While the lens will adhere to element 104 with or without the surfactant, the surfactant wets the surface of the convex carrier element 104 and promotes adhesion thereto by virtue of the surface tension of the deionized water and the surrounding atmospheric pressure. In the transfer, it is desirable to position each of the convex carrier elements 104 within 1.5mm of the lens to ensure a direct and precise transfer.

Figure 7B:
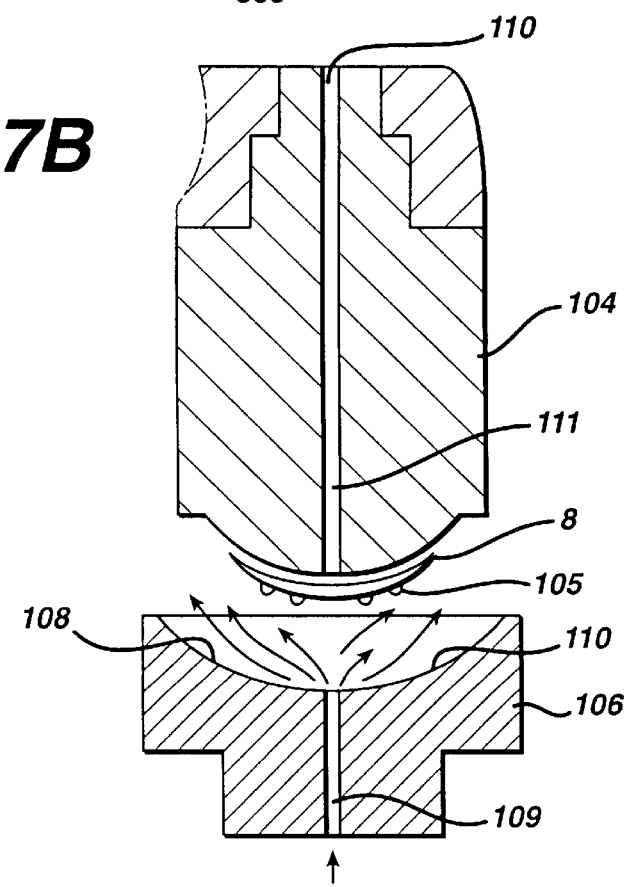

After transfer of the lens 8 to the convex element 104, the robotic transfer device then moves the array of lenses to a "bubble blow off" station which includes a manifold arrangement similar to manifold 860 with a plurality of cup members 106 one of which is illustrated in FIG. 7B. Each of the cup members has a concave surface 108 of approximately the same configuration as the convex surface of the second lens carrier element 104. While a concave surface such as surface 108 has been found to be desirable, a single jet device will also provide the same function. The concave surface 108 also includes at least one port 110 defined therein for admission of pressurized fluid through a central passageway 109 formed in the cup member. The use of a small amount of surfactant in the deionized water promotes the transfer of the lens from first to second carrier elements, but also enables the formation of small air bubbles 105 in the layer of deionized water which coats the contact lens 8. By subjecting the lens to a jet of pressurized fluid, the small bubbles 105 are migrated outwardly and dissipated prior to the transfer of the lens to the inspection carrier. Removal of the air bubbles is desirable to avoid false negative reports from the automatic lens inspection system which is used to inspect the lenses. While pressurized air is used in the preferred embodiment of the invention, deionized water may also be used.

PACKAGE CARRIER DOSING

Figure 10:
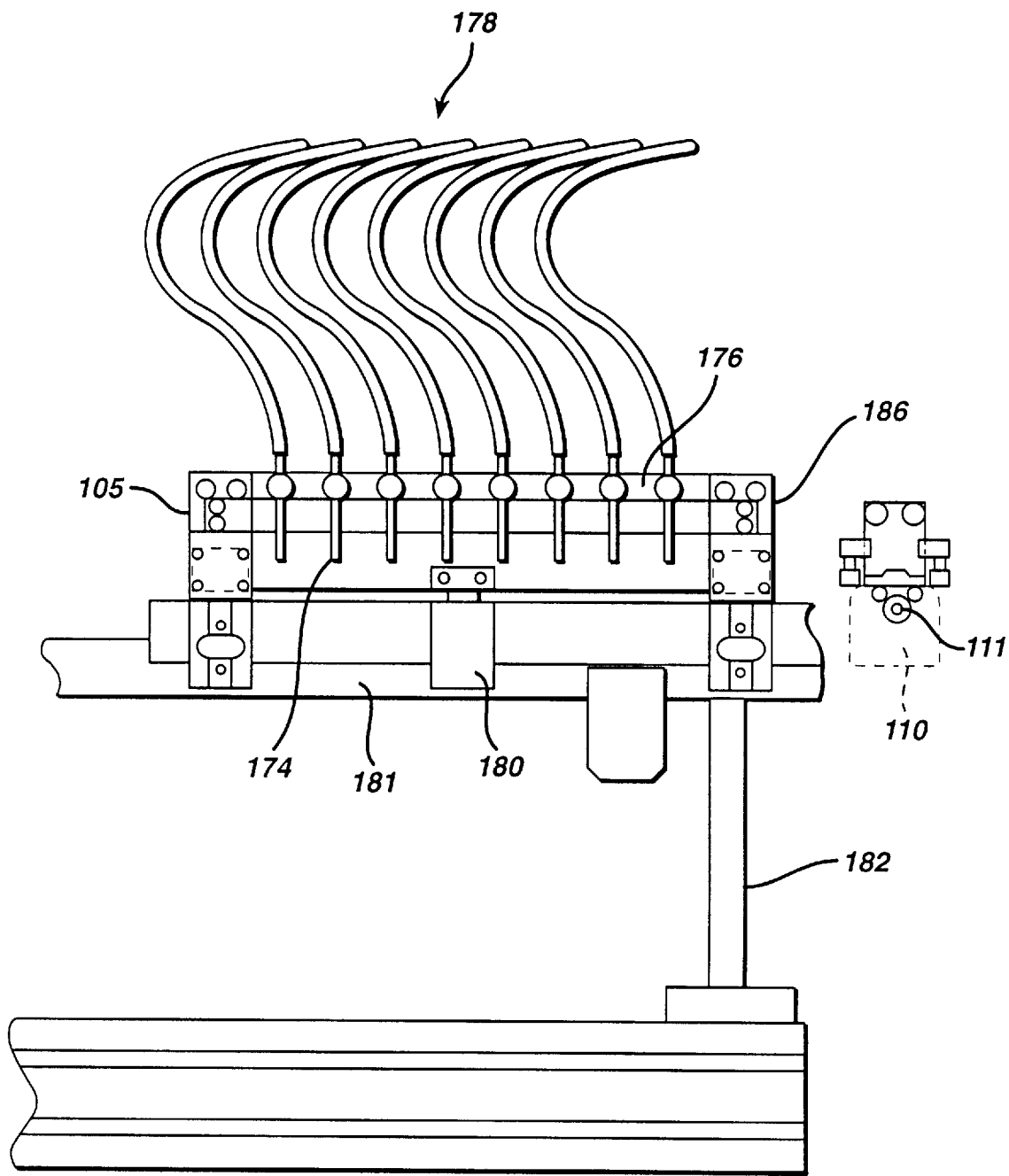
FIG. 10 is an elevation and side view of an apparatus used for filling package carriers with degassed and deionized water in accordance with the practice of the present invention.
Figure 11:
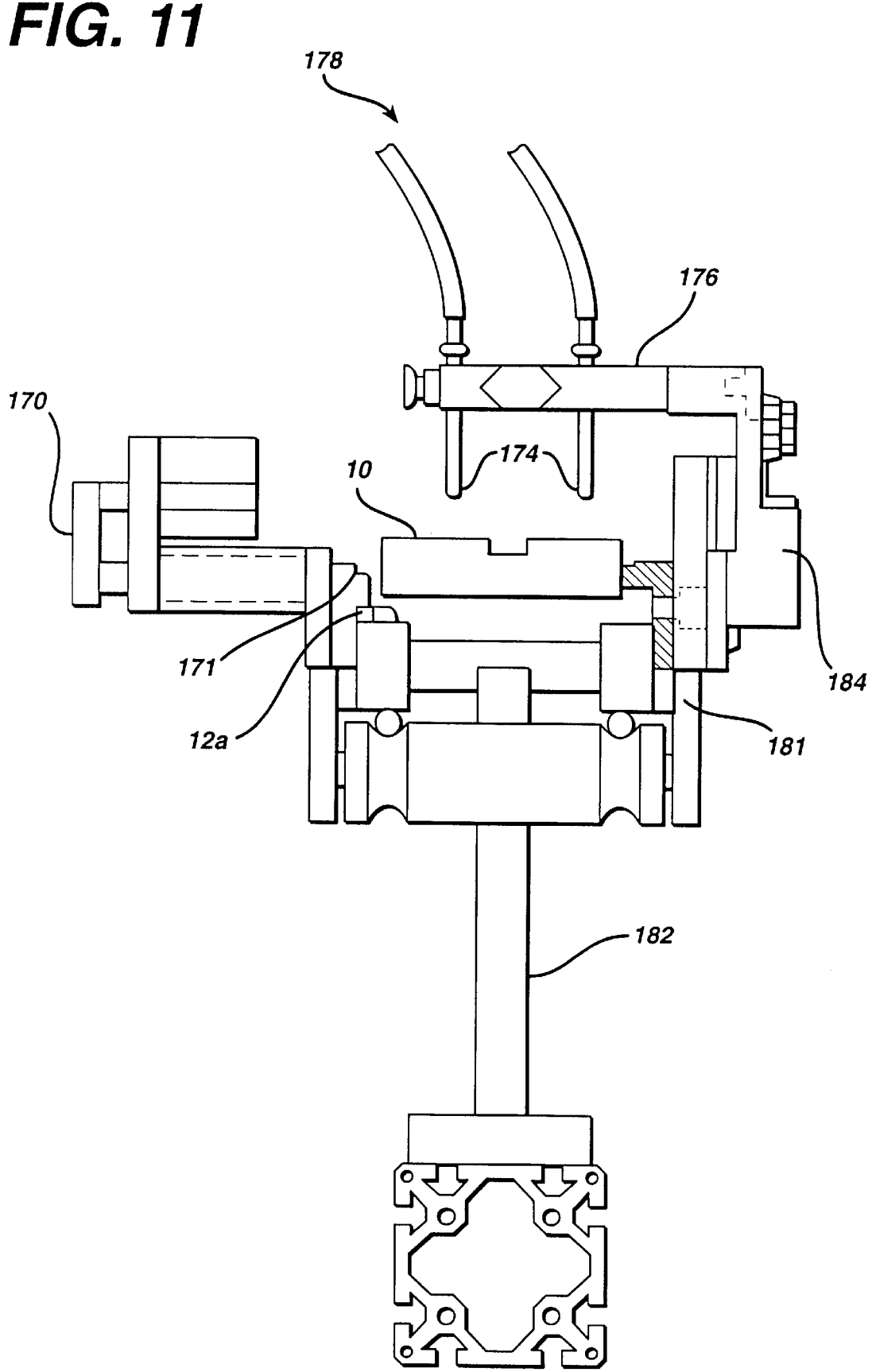
FIG. 11 is a partially cross-section elevation and end view of the apparatus illustrated in FIG. 10.

As was described earlier with respect to FIGS. 3 and 5, deionized water is degassed in a degas unit 122 and distributed by a plurality of precision dosing pumps 140 to a deionized water dosing station 16, which is more fully illustrated in FIGS. 10 and 11. As illustrated in FIG. 11, a rubber belt conveyor 12(*a*) having a pair of belts carries the inspection carrier 10 from the package carrier loading area 11 (illustrated in FIG. 3) to the deionized water dosing station 16. A pneumatic stop 170 having a paul 171 is used to hold a series of inspection carriers 10 upstream of the dosing station 16. When a new inspection carrier 10 is to be loaded, the pneumatic stop mechanism 170 retracts paul 171, allowing the inspection carrier 10 to be carried into the dosing station on conveyor 12(*a*). A separate set of jaws mounted on another pneumatic locking mechanism engages the inspection pallet 10 in a similar manner to hold it securely in position for package dosing. A plurality of dosing nozzles 174 are mounted on a horizontal reciprocating beam support member 176 and are connected to the F.M.I. precision dose pumps 140 by virtue of a plurality of tubing members 178 with a separate pump for each nozzle. Each of the nozzle members 174 terminates in a sixteen gauge teflon needle having an ID of 0.045 inches–0.048 inches which is suspended directly above the package carriers 20, and more particularly, above the bowl member 36. In operation, a pneumatic cylinder 180 which is fixably secured to support frames 181 and 182 reciprocates carriage member 184, vertical supports 185,186 and the horizontal mounting beam 176 to enable the teflon needle tips to be lowered into the recessed bowl 36 of the package carriers 20. The tips are reciprocated downwardly, and approximately 600 microliters of degassed and deionized water is injected therethrough to partially fill the bowl 36. After the bowls are filled with the desired dosage, pneumatic cylinder 180 is actuated and the reciprocal support beam 176 is raised to lift the teflon needles free of the package carriers 20. The use of a reciprocating dosing needle eliminates agitation or splashing in the dosing of the degassed and deionized water. Undue agitation or splashing may also lead to the enlargement of air and the formation of air bubbles which may generate a false negative inspection signal. The inspection carrier 10 is then advanced out of the dosing station 16 to the end of conveyor 12(*a*) where it engages a push conveyor, which pushes the inspection carrier 10 across a stainless steel platform to the lens inspection loading area.

While 2×8 and 4×8 arrays have been utilized in the post-hydration processing section of the present invention, it is understood that a variety of array configurations could be utilized in the practice of the present invention.

The 4×8 array of the hydration carrier 860 illustrated in FIG. 6 is different than the 4×8 array of package carriers in the lens loading area formed by a pair of pallets 10. The 4×8 array 102 mounted on robotic transfer means 100 is adjustable to accommodate the first 4×8 array in the hydration carrier 860 which has 30 mm centers between lenses, and the "bubble blow off" station 70, and then expands to 30×50 mm centers, which is the dimension of the third 4×8 array at the lens loading area formed by a pair of inspection pallets 10 as will be hereinafter described with respect to FIGS. 8 and 9.

Figure 8:
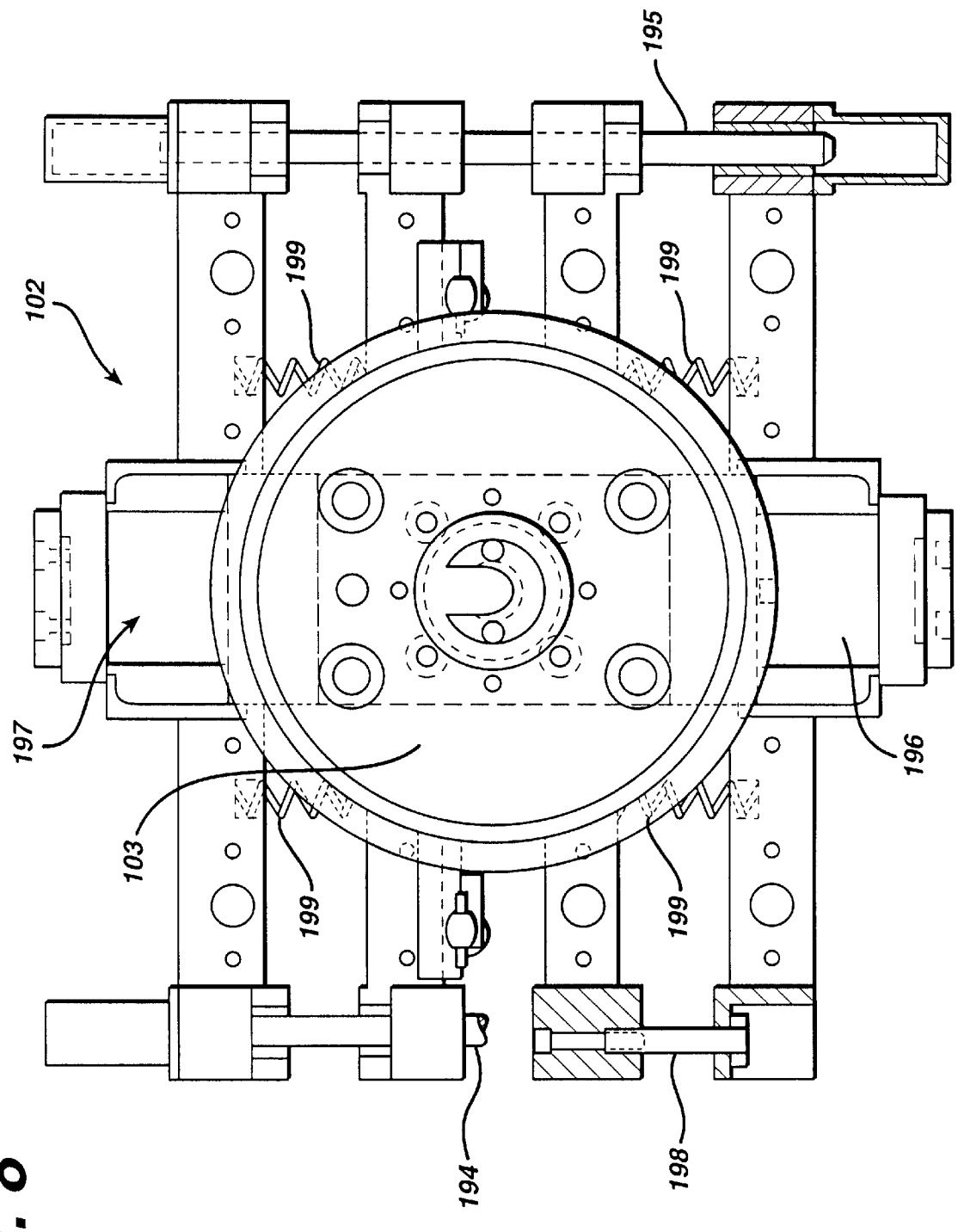
FIG. 8 is a diagrammatic and partially cross-section plan view of the articulated robotic transfer head in the expanded position, as viewed from above.
Figure 9:
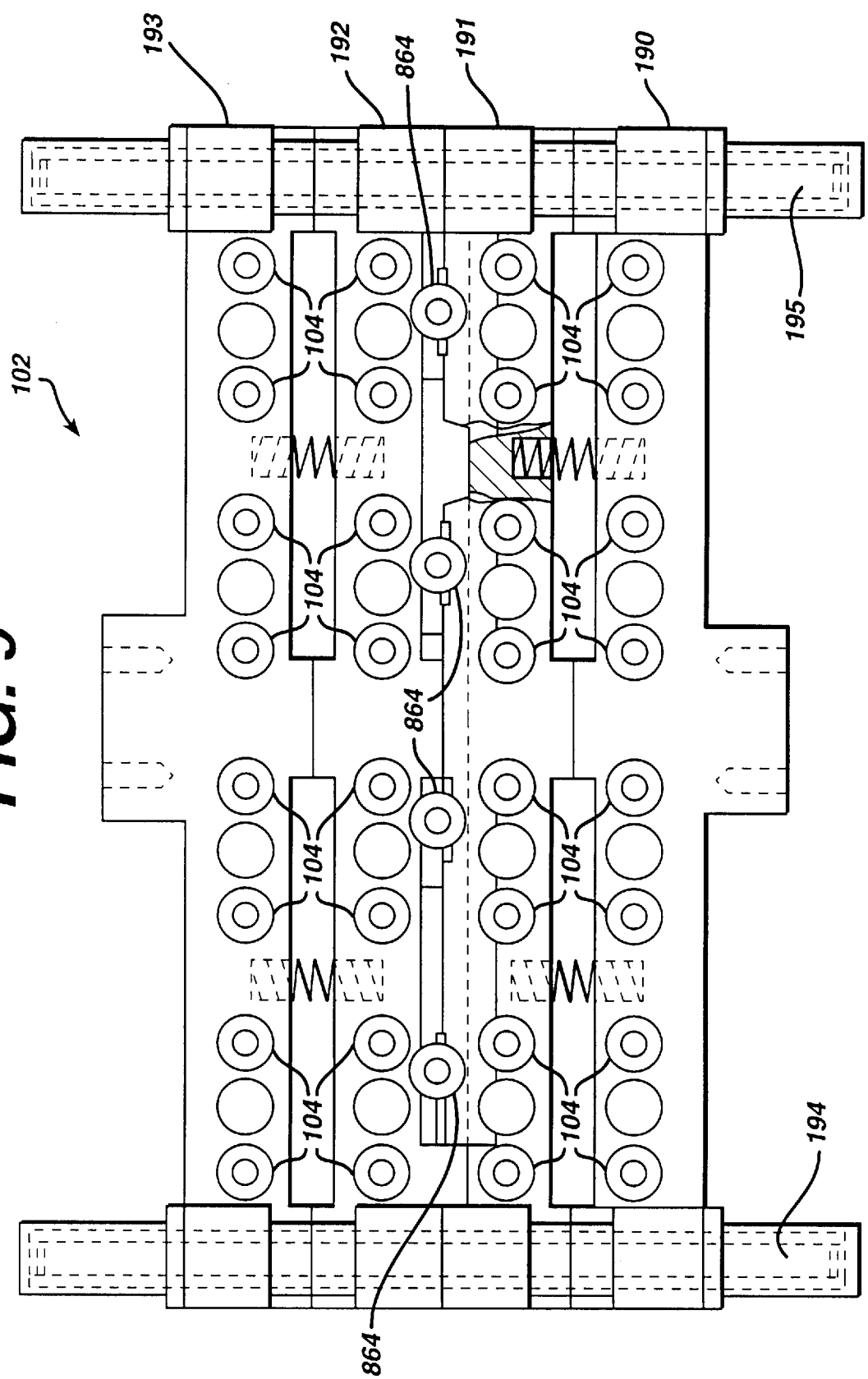
FIG. 9 is a diagrammatic and partially cross-sectioned illustration of the articulated robotic transfer head in plan view in a closed position, as illustrated from below.

As illustrated in FIGS. 8 and 9, the 4×8 array 102 is illustrated in an expanded configuration in FIG. 8, and a collapsed configuration in FIG. 9. The array 102 includes thirty-two convex lens carrier elements 104 as previously described with respect to FIGS. 6 and 7. Along the center line of the array are four fluid coupling members 864 which engage conduits 863 on the second hydration carriers 860. The array is made of four separate lines or elements 190–193, each of which carries eight convex carriers 104.

Each of the linear members 190–193 is mounted for reciprocation along internal guide rods 194 and 195 as more fully illustrated in FIG. 8. A pneumatic chuck 196,197 is positioned on either side of the array, and upon actuation draws the outer most elements 190,193 outwardly as illustrated in FIG. 8 along the guide rods 194,195. Each of the outer most arrays 190,193 also carries a pair of internal sliding stops, one of which is illustrated in FIG. 8 at 198 which draw the inner most linear elements 191 and 192 outwardly, with linear element 190 drawing linear 191, and linear element 193 drawing linear element 192. Compression springs 199 also assist in separating the linear elements of the array.

It should also be noted that the array 102 is rotatable about turntable 103 to provide for the proper orientation of the array when transferring lenses from the hydration station to the lens loading area, the turntable 103 is mounted on first and second articulated arms which enables complete three dimensional movement of the 4×8 array between each of the various transfer points which the robotic transfer device serves.

As illustrated in FIG. 7A and 7B, each of the convex lens carrier elements 104 also includes an interior conduit 110 terminating in at least one port 111 which may be used to introduce a fluid between the convex lens carrier element and the contact lens 8. When the array 102 is positioned over the plurality of lens carrier elements 20 at the lens loading area, the array elements 191–193 are spread to align each of the convex lens carrier elements 104 with an associated package carrier 20 immediately there below, and a small amount, nominally 300 $\mu$l, of degassed and deionized water is pumped by precision dosing pumps 140 through conduit 110 to transfer the contact lens 8 from the convex carrier 104 to the bowl 36 of the package carrier 20. Again, the use of degassed deionized water enables transfer of the lens without risking the development of small air bubbles from dissolved gasses in the deionized water that might otherwise "seed" on the contact lens 8. After the lenses 8 have been transferred to the package carrier 20, the 4×8 array 102 is collapsed by actuating air chucks 196, 197, (FIG. 8) to return the array to a configuration that matches the configuration of the hydration carrier 860.

When a pair of inspection carriers 10 have been loaded at the lens loading area, a second servo motor actuated push arm transfers both pallets from the lens loading area to an overhead double axis transport carrier which singulates one of the inspection carriers and picks up a single carrier 10 for transfer to the automatic lens inspection station, as more completely described in the parent application U.S. Ser. No. 258,557, now U.S. Pat. No. 5,578,331, entitled "Automated Apparatus and Method for Preparing Contact Lenses".

While the invention has been particularly shown and described with respect to the preferred embodiments thereof, it will be understood by those skilled in the art that the foregoing, and other changes in form and details, may be made therein without departing from the spirit and scope of the invention, which is limited only by the scope of the following claims.

We claim:

1. An apparatus for degassing deionized water for use in inspecting and packaging contact lenses, said apparatus comprising:

(a) a vacuum chamber;

(b) a plurality of gas permeable tubes mounted within said chamber for sequentially receiving deionized water to be degassed;

(c) means for creating a pressure differential to cause said deionized water to flow through said plurality of gas permeable tubes;

(d) a manifold for distributing said degassed and deionized water to a plurality of distribution points;

(d) at least one precision metering pump for metering less than one ml of degassed and deionized water at each one of said distribution points.

2. An apparatus for degassing deionized water for use in inspecting and packaging contact lenses as claimed in claim 1 wherein said gas permeable tubes are formed of silicone rubber having a 80 durometer hardness.

3. An apparatus for degassing deionized water for use in inspecting and packaging contact lenses as claimed in claim 2 wherein each of said gas permeable tubes has an inner diameter of from 1/8 to 1/2 inch with a wall thickness of 1/16" to 1/32".

4. An apparatus for degassing deionized water for use in inspecting and packaging contact lenses as claimed in claim 3 wherein each of said gas permeable tubes has an inner wall diameter of 1/4 inch.

5. An apparatus for degassing deionized water for use in inspecting and packaging contact lenses as claimed in claim 3 wherein each of said gas permeable tubes has a 1/32 inch wall thickness.

6. An apparatus for degassing deionized water for use in inspecting and packaging contact lenses as claimed in claim 3 wherein said gas permeable tubes are bundled into a plurality of degass manifold assemblies.

7. An apparatus for degassing deionized water for use in inspecting and packaging contact lenses as claimed in claim 6 wherein said deionized water is supplied to individual tubes in said degass manifold assemblies in a parallel flow path, and to said degass manifold assemblies in a serial flow path.

8. An apparatus for degassing deionized water for use in inspecting and packaging contact lenses as claimed in claim 1 wherein said apparatus further includes a storage tank for receiving deionized water to be degassed.

9. An apparatus for degassing deionized water for use in inspecting and packaging contact lenses as claimed in claim 8 wherein said means for creating a pressure differential is a positive pressure air blanket maintained within said storage tank.

10. An apparatus for degassing deionized water for use in inspecting and packaging contact lenses as claimed in claim 1 wherein said manifold includes a plurality of individual nozzles mounted above a plurality of contact lens packages.

11. An apparatus for degassing deionized water for use in inspecting and packaging contact lenses as claimed in claim 10 wherein said manifold reciprocates vertically when dispensing said degassed and deionized water into said contact lens packages.

12. An apparatus for degassing deionized water for use in inspecting and packaging contact lenses as claimed in claim 11 wherein said nozzles are reciprocated into said contact lens packages, and said precision metered flow is terminated while a tip of each of said nozzles is still immersed in said dispensed degassed and deionized water, said nozzle tips being reciprocated vertically away from said packages after said flow is terminated.

13. An apparatus for degassing deionized water for use in inspecting and packaging contact lenses as claimed in claim 1 wherein said plurality of distribution points include a plurality of contact lens carriers, each of said carriers defining a convex lens attachment surface to receive a contact lens and a fluid passageway for introducing said degassed and deionized water between a contact lens carried by said convex contact lens attachment surface and said convex surface.

* * * * *